April 24, 1962
R. W. JOHNSON ETAL
METHOD AND APPARATUS FOR DETERMINING
AMALGAM DECOMPOSITION RATE
Filed Dec. 18, 1958
3,031,385
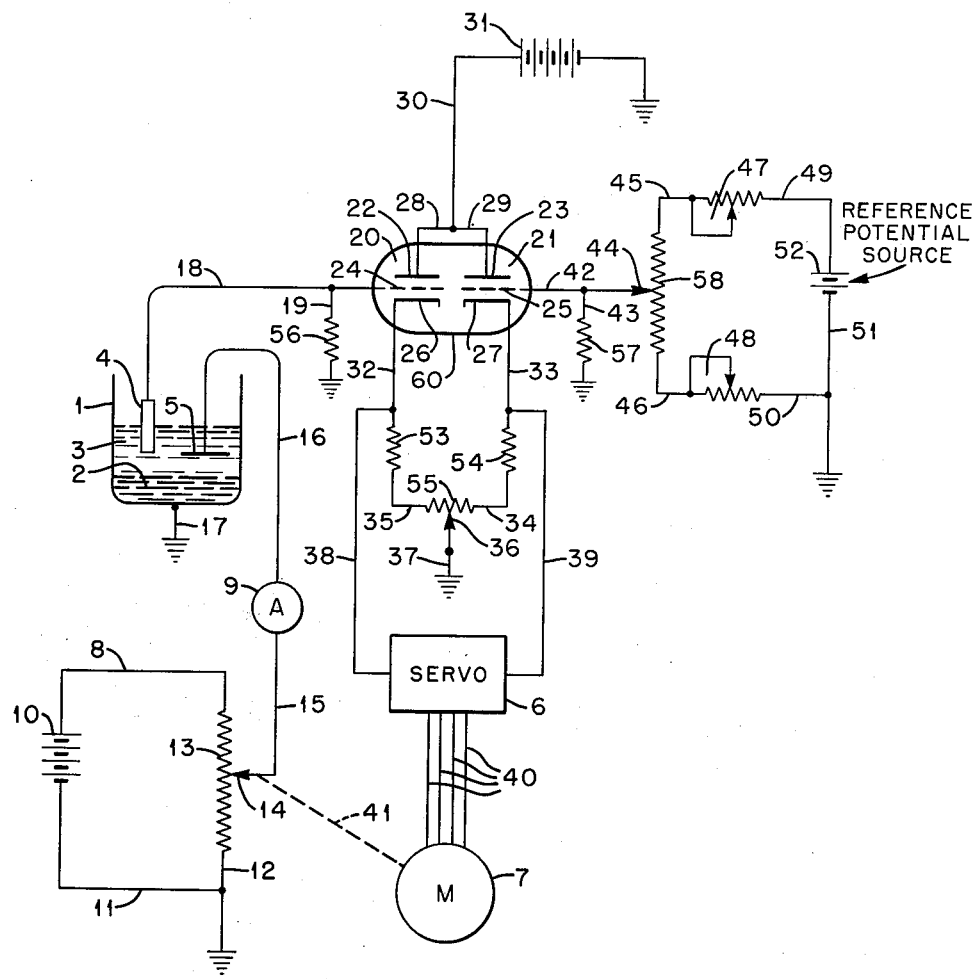
INVENTORS.
Robert W. Johnson &
Colman C. Wright
BY
*Roland A. Anderson*
ATTORNEY

United States Patent Office 3,031,385
Patented Apr. 24, 1962

3,031,385
METHOD AND APPARATUS FOR DETERMINING AMALGAM DECOMPOSITION RATE
Robert W. Johnson and Colman C. Wright, Oak Ridge, Tenn., assignors to the United States of America as represented by the United States Atomic Energy Commission
Filed Dec. 18, 1958, Ser. No. 781,415
4 Claims. (Cl. 204—1)

This invention relates to a method and apparatus for measuring the rate at which an amalgam decomposes in contact with aqueous solutions.

The knowledge of the rate of decomposition of an amalgam in contact with aqueous solutions is desired for the reason that in the processes using mercury cells in which such contact is made, the presence of even trace quantities of certain impurities in the aqueous solution significantly increases the rate of decomposition and may, if the decomposition rate is high enough, render the process completely useless. It has been found that the impurities and their resultant effect upon the stability of the amalgam produced, of the aqueous solutions purchased for processing in the above process show significant differences between vendors and also "between lot" differences for material purchased from any individual vendor. Due to the apparent synergistic effects of certain combinations of trace impurities, it is virtually impossible to predict the amalgam stability even from a precise chemical analysis of the parent material. Therefore, it is necessary to devise some method and apparatus to determine the amalgam decomposition rate for each lot of aqueous solution used in mercury cell processes by some method other than chemical analysis.

With a knowledge of the difficulty of determining by chemical analysis the amalgam stability of a material, it is a primary object of this invention to provide a method and apparatus for measuring the rate at which an amalgam decomposes in contact with aqueous solutions.

It is still another object of this invention to provide a method and apparatus for controlling the concentration of an amalgam at some predetermined value and displaying the value of the current required to maintain this concentration constant.

These and other objects and advantages will be apparent from a consideration of the following detailed specification and the accompanying drawing wherein:

The single FIGURE on the drawing illustrates a system in which the amalgam stability may be determined.

These objects may be accomplished by providing an electrolytic cell in which an amalgam and an aqueous hydroxide solution are disposed. The amalgam is used as the cathode of the cell and an electrode and an anode are disposed in the aqueous solution. A variable source of plating potential is connected across the cell. The difference in voltage between the amalgam cathode and a calibrated source of reference potential is used to control the variable source to null the difference in voltage and at the same time to maintain the concentration of the amalgam at some predetermined constant value. The value of the current required to maintain this concentration constant is indicative of the decomposition rate of the amalgam as more fully discussed below.

Referring now to the drawing which illustrates one system in which the principles of this invention may be carried out, a cell 1 has disposed therein an amalgam 2, which is used as a cathode, an electrolyte 3 of an aqueous hydroxide solution, a reference electrode 4, and a nickel anode 5. The electrode 4 and anode 5 are immersed in the aqueous solution 3. The cell cathode 2 is grounded by a lead 17. The electrode 4 is connected by a lead 18 to the control grid 24 of section 20 of a dual cathode follower type tube 60. The control grid 25 of section 21 of the dual tube 60 is connected by lead 42 to potentiometer tap 44 which is slidable on a potentiometer 58 to provide a source of reference potential for section 21 of the dual tube 60. Potentiometer 58 is connected at one end to one side of a reference potential source 52 by a lead 45, an adjustable resistance network 47, and a lead 49. The other end of potentiometer 58 is connected to the other side of source 52 by a lead 46, an adjustable resistance network 48, lead 50, and lead 51. Lead 51 is also connected to ground. Plates 22 and 23 of sections 20 and 21, respectively, of the dual tube 60 are connected by leads 28 and 29, respectively, to a common lead 30 which is in turn connected to one side of a source of plate potential 31. The other side of source 31 is grounded. Cathode 26 of section 20 of tube 60 is connected by a lead 32, resistance 53, lead 35, resistance 55, lead 34, resistance 54, and lead 33 to cathode 27 of section 21 of tube 60. Resistance 55 is a potentiometer which has an adjustable tap 36 connected by a lead 37 to ground.

A simple servo amplifier 6 is connected to cathode 26 by a lead 38 and lead 32, and to cathode 27 by a lead 39 and lead 33. The output of the servo amplifier 6 controls a servo motor 7 through leads 40. Motor 7 controls the position of tap 14 on a potentiometer 13 by means of the mechanical coupling 41. One side of potentiometer 13 is connected to one side of a battery 10 by a lead 8. The other side of potentiometer is grounded by a lead 12 and is also connected to the other side of battery 10 by leads 12 and 11. Tap 14 of potentiometer 13 is connected to anode 5 of the cell 1 by a lead 15, ammeter 9 and lead 16.

Lead 18, in addition to being connected to grid 24, is connected to ground through lead 19 and a high resistance 56. Lead 42, in addition to being connected to grid 25, is connected to ground through lead 43 and a high resistance 57.

The amalgam 2 may be a 0.65 molar solution of lithium in mercury and the electrolyte 3 may be a lithium hydroxide solution, for example. The reference electrode 4 may be a saturated calomel electrode, for example. The tube 60 is a 6SN7, for example. The battery 52 has a potential of 2.68 volts, and the battery 10 has a potential of 16 volts, for example. Resistances 53 and 54 are each 560 ohms, resistance 55 is 250 ohms, resistances 56 and 57 are each 5.1 megohms, resistance or potentiometer 58 is 500 ohms, and the potential of battery 31 is 108 volts, for example.

In operation of the device as illustrated in the drawing having the parameters set forth above, the system is properly adjusted by means of the balancing potentiometer 55. When thus balanced, the difference in potential between that of the calomel side cathode 26 and that of the reference side cathode 27 is directly proportional to the difference between the amalgam cathode 2 potential and the reference potential. Now, the amalgam cathode 2 potential is some function of the concentration of lithium in the amalgam 2; therefore, the difference in the potential between the two cathodes 26 and 27 is a function of the difference between the actual amalgam concentration and some predetermined value which is established by proper adjustment of the reference potential which is controllable within the range of 2.25 to 2.35 volts. The reference potential is adjusted to a particular set point which represents a definite concentration of lithium in the amalgam. The servo amplifier 6 and the servo motor 7 are used to observe the difference in cathode potentials and to automatically vary the output of the potentiometer 13 which furnishes the plating potential to the anode 5 of the cell 1. Thus, when the system has come to equilibrium, that is when the two cathode potentials are equal, the current required to maintain constant lithium amalgam concentration may be read on the ammeter 9 or it may be recorded on any suitable recording device, not shown. The above system actually controls the concentration of the amalgam at some predetermined value and displays the value of the current required to maintain this concentration constant.

The amalgam decomposition rate is directly proportional to the amalgam area times the square root of the amalgam concentration and may be expressed mathematically by the equation $$\frac{dC}{dt} = kA\sqrt{C}$$

where:

$k$ is the decomposition rate constant
$A$ is the area, and
$C$ is the amalgam concentration.

Plating rate on the other hand is given by the equation $$\frac{dC}{dt} = \frac{I}{F}$$

where:

$I$ is the current flow, and
$F$ is the Faraday.

The rates of the two opposing reactions are equal in magnitude when a steady state condition exists. Combining the two equations above, we have found that $$k = \frac{I}{AF\sqrt{C}}$$

According to our invention we hold the concentration $C$ constant by the application of an electromotive force. Since $A$ and $F$ are constant, then $k$ is directly proportional to the current $I$ required to maintain that concentration, and the current flowing through calibrated ammeter 9 will indicate the decomposition rate directly.

The batch process described may be utilized on a continuous basis as well. The cell 1 may be placed in the product input line, containing the aqueous solution, to a mercury cell process, and a two-way control valve, not shown, may be used to direct the output flow from the cell either to the process system or to purifiers depending upon the decomposition rate of the amalgam in the cell as determined by the reading on ammeter 9. The process may be performed manually by an operator who reads ammeter 9 or automatically by moving the valve to one position or the other as the metered current through ammeter 9 is below or above a selected value.

The system illustrated in the drawing is useful in systems other than that set forth above. For example, it could be used in appraising the purity of sodium chloride solutions used in the industrial production of chlorine and sodium hydroxide by the mercury cell process.

This invention has been described by way of illustration rather than limitation and it should be apparent that the invention is equally applicable in fields other than those described.

What is claimed is:

1. The method of rapidly determining the decomposition rate of a metal amalgam in contact with an aqueous, metal hydroxide solution, said amalgam and said solution having the same metal constituent, comprising the steps of forming said solution; contacting said solution with a metal amalgam cathode, a reference electrode, and an anode; passing an electrolyzing current between said anode and cathode; measuring any difference in potential between a calibrated source of reference potential and said amalgam cathode; changing the rate of flow of said current to continuously null said difference in potential; and displaying the rate of said current flow as an indication of said decomposition rate.

2. The method set forth in claim 1, wherein the aqueous solution is lithium hydroxide, and the metal amalgam cathode is a lithium amalgam.

3. A system for indicating the decomposition rate of a metal amalgam in contact with an aqueous, metal hydroxide solution comprising an electrolytic cell consisting of an amalgam disposed in said cell, an aqueous, metal hydroxide solution disposed in said cell in contact with said amalgam, and a reference electrode and an anode which are immersed in said aqueous solution, said amalgam being the cathode of said cell, a calibrated source of reference potential, a variable source of plating potential connected across said cell for supplying an electrolyzing current between said anode and said cathode, means for detecting the difference in potential between said reference source and that of said amalgam cathode, means responsive to said difference in potential and coupled to said variable source for varying said variable source and said electrolyzing current to null said difference in potential to thereby continuously maintain the concentration of the amalgam constant, and means for indicating the rate of flow of said electrolyzing current supplied to said cell which rate of flow is indicative of the decomposition rate of said amalgam.

4. The system set forth in claim 3, wherein the aqueous solution is lithium hydroxide, and the amalgam cathode is a lithium amalgam.

References Cited in the file of this patent

UNITED STATES PATENTS

| | | |
|---|---|---|
| 2,246,981 | Matheson et al. | June 24, 1941 |
| 2,584,816 | Sands | Feb. 5, 1952 |
| 2,758,079 | Eckfeldt | Aug. 7, 1956 |
| 2,832,734 | Eckfeldt | Apr. 29, 1958 |
| 2,886,770 | Jackson | May 12, 1959 |

OTHER REFERENCES

Evans: "Metallic Corrosion Passivity and Protection," 1937, page 507.